US012724766B2

(12) United States Patent
Lintilhac et al.

(10) Patent No.: US 12,724,766 B2
(45) **Date of Patent: *Sep. 1, 2026**

(54) SYSTEMS AND METHODS FOR WRITING UPDATES TO AND/OR READING PREVIOUSLY STORED UPDATES OF ASSETS IMPLEMENTED AS SMART CONTRACTS ON A DECENTRALIZED DATABASE

(71) Applicant: Trace Labs LLC, Shelburne, VT (US)

(72) Inventors: Paul Lintilhac, Springfield, VT (US); Joshua Decatur, South Hero, VT (US); Paul Oostenrijk, De Rips (NL); Laura Seach, Brooklyn, NY (US)

(73) Assignee: Trace Labs LLC, Shelburne, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/985,911

(22) Filed: Dec. 18, 2024

(65) Prior Publication Data

US 2025/0173326 A1 May 29, 2025

Related U.S. Application Data

(63) Continuation of application No. 18/336,570, filed on Jun. 16, 2023, now Pat. No. 12,182,107, which is a (Continued)

(51) Int. Cl.
*G06F 16/00* (2019.01)
*G06F 16/13* (2019.01)
(Continued)

(52) U.S. Cl.
CPC ........ *G06F 16/2379* (2019.01); *G06F 16/137* (2019.01); *G06F 16/168* (2019.01);
(Continued)

(58) Field of Classification Search
CPC .... G06F 16/2379; G06F 16/27; G06F 16/219; G06F 16/137; G06F 16/168
(Continued)

(56) References Cited

U.S. PATENT DOCUMENTS 6,442,276 B1 8/2002 Doljack
10,868,674 B2 * 12/2020 Beecham .............. H04L 9/0637
(Continued)

FOREIGN PATENT DOCUMENTS

CN 110532238 A 12/2019
EP 2894596 A1 7/2015
EP 3539885 A1 9/2019

OTHER PUBLICATIONS

Benet, Juan. "IPFS—Content Addressed, Versioned, P2P File System (Draft 3)." Jul. 14, 2014. (11 pages).
(Continued)

*Primary Examiner* — Monica M Pyo
(74) *Attorney, Agent, or Firm* — Esplin & Associates, PC

(57) ABSTRACT

Systems and methods for writing updates to and/or reading previously stored updates of assets that are implemented as smart contracts on a decentralized database are disclosed. Exemplary implementations may: receive a first request, from a first client computing device associated with a first user, to write a first update to an individual asset, or to read one or more previously stored updates; transfer the first request to the decentralized database; responsive to transferring the first request, receive the first reference from the decentralized database; generate a second file and a second reference; store the second file on the content-addressable file system; and record the second reference in the state of the individual asset on the decentralized database.

18 Claims, 5 Drawing Sheets

Related U.S. Application Data continuation of application No. 17/712,977, filed on Apr. 4, 2022, now Pat. No. 11,734,262, which is a continuation of application No. 16/811,878, filed on Mar. 6, 2020, now Pat. No. 11,294,889, which is a continuation of application No. 16/579,118, filed on Sep. 23, 2019, now Pat. No. 10,585,882.

(51) Int. Cl.

| | |
|---|---|
| ***G06F 16/16*** | (2019.01) |
| ***G06F 16/182*** | (2019.01) |
| ***G06F 16/21*** | (2019.01) |
| ***G06F 16/23*** | (2019.01) |
| ***G06F 16/27*** | (2019.01) |
| ***H04L 9/06*** | (2006.01) |
| ***H04L 9/32*** | (2006.01) |

(52) U.S. Cl.

CPC ........ *G06F 16/1834* (2019.01); *G06F 16/219* (2019.01); *G06F 16/27* (2019.01); *H04L 9/0637* (2013.01); *H04L 9/3247* (2013.01)

(58) Field of Classification Search

USPC .......................................................... 707/703

See application file for complete search history.

(56) References Cited

U.S. PATENT DOCUMENTS

| | | | | |
|---|---|---|---|---|
| 11,126,613 | B2 * | 9/2021 | Ow | G06F 16/137 |
| 11,196,569 | B2 * | 12/2021 | Bessonov | H04L 9/321 |
| 11,468,431 | B2 * | 10/2022 | Williams | H04L 9/0897 |
| 11,625,711 | B2 * | 4/2023 | Ow | G06Q 20/3672 705/66 |
| 11,783,024 | B2 | 10/2023 | Padmanabhan | |
| 11,797,982 | B2 * | 10/2023 | Coburn | G06Q 20/3678 |
| 11,870,847 | B2 * | 1/2024 | Todd | G06F 16/27 |
| 2013/0117245 | A1 | 5/2013 | Robinson | |
| 2017/0048235 | A1 * | 2/2017 | Lohe | G06Q 50/01 |
| 2017/0344988 | A1 | 11/2017 | Cusden | |
| 2018/0268479 | A1 | 9/2018 | Dowling | |
| 2019/0370816 | A1 | 12/2019 | Hu | |
| 2020/0005559 | A1 | 1/2020 | Grunbok, II | |
| 2020/0045538 | A1 | 2/2020 | Dattawadkar | |
| 2020/0117818 | A1 * | 4/2020 | Latka | H04L 67/1097 |
| 2020/0175554 | A1 * | 6/2020 | Vukich | H04L 9/3239 |
| 2020/0294048 | A1 | 9/2020 | Ye | |
| 2021/0157827 | A1 | 5/2021 | Dittmann | |
| 2021/0158039 | A1 | 5/2021 | Dittmann | |
| 2024/0273554 | A1 | 8/2024 | Lintilhac | |

OTHER PUBLICATIONS

Vogelsteller, Fabian & Yasaka, Tyler. "ERC-725: General data key/value store and execution." Oct. 2, 2017. (12 pages).

Origin Protocol Team. "Origin Protocol Technical Whitepaper." 2018. (16 pages).

Azaria, Asaph, et al. "MedRec: Using Blockchain for Medical Data Access and Permission Management." 2nd International Conference on Open and Big Data, 2016. (6 pages).

Ramsundar, Bharath, et al. "Tokenized Data Markets." arXiv:1806.00139, May 31, 2018. (25 pages).

* cited by examiner

SYSTEMS AND METHODS FOR WRITING UPDATES TO AND/OR READING PREVIOUSLY STORED UPDATES OF ASSETS IMPLEMENTED AS SMART CONTRACTS ON A DECENTRALIZED DATABASE

CROSS-REFERENCE TO RELATED APPLICATIONS

This application incorporates U.S. Pat. No. 10,412,086 in its entirety.

FIELD OF THE DISCLOSURE

The present disclosure relates to systems and methods for writing updates to and/or reading previously stored updates of assets that are implemented as smart contracts on a decentralized database.

BACKGROUND

Decentralized databases are known. Client computing devices are known. Ledgers are known. File systems are known, such as a file system on a client computing device. Reading and writing files that are stored on a file system of a client computing device is known.

SUMMARY

One aspect of the present disclosure relates to a system configured for writing updates to and/or reading previously stored updates of assets that are implemented as smart contracts on a decentralized database. The system may include one or more hardware processors configured by machine-readable instructions. The processor(s) may be configured to receive a first request, from a first client computing device associated with a first user, to write a first update to an individual asset, or to read one or more previously stored updates to the individual asset. The individual asset may have a state. The state may include a first reference to a first file on a content-addressable file system. Information included in the first file forms part of the state of the individual asset. The processor(s) may be configured to transfer the first request to the decentralized database. The processor(s) may be configured to, responsive to transferring the first request, receive the first reference from the decentralized database. The first reference may refer to the first file on the content-addressable file system. In some implementations, the processor(s) may be configured to obtain the referenced file, as well as other files referenced thereby. In some implementations, the processor(s) may be configured to generate a second file and a second reference. Contents of the second file may include the first update and the first reference to the first file. The second reference may refer to the second file on the content-addressable file system. The processor(s) may be configured to store the second file on the content-addressable file system. Storage may be based on the second reference. The processor(s) may be configured to record the second reference in the state of the individual asset on the decentralized database.

Another aspect of the present disclosure relates to a method for writing updates to and/or reading previously stored updates of assets that are implemented as smart contracts on a decentralized database. The method may include receiving a first request, from a first client computing device associated with a first user, to write a first update to an individual asset, or to read one or more previously stored updates to the individual asset. The individual asset may have a state. The state may include a first reference to a first file on a content-addressable file system. Information included in the first file forms part of the state of the individual asset. The method may include transferring the first request to the decentralized database. The method may include, responsive to transferring the first request, receiving the first reference from the decentralized database. The first reference may refer to the first file on the content-addressable file system. In some implementations, the method may include obtaining the referenced file, as well as other files referenced thereby. In some implementations, the method may include generating a second file and a second reference. Contents of the second file may include the first update and the first reference to the first file. The second reference may refer to the second file on the content-addressable file system. The method may include storing the second file on the content-addressable file system. Storage may be based on the second reference. The method may include recording the second reference in the state of the individual asset on the decentralized database.

As used herein, any association (or relation, or reflection, or indication, or correspondency) involving servers, processors, client computing devices, requests, assets, states, updates, responses, references, files, hash values, hash functions, verifications, validations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
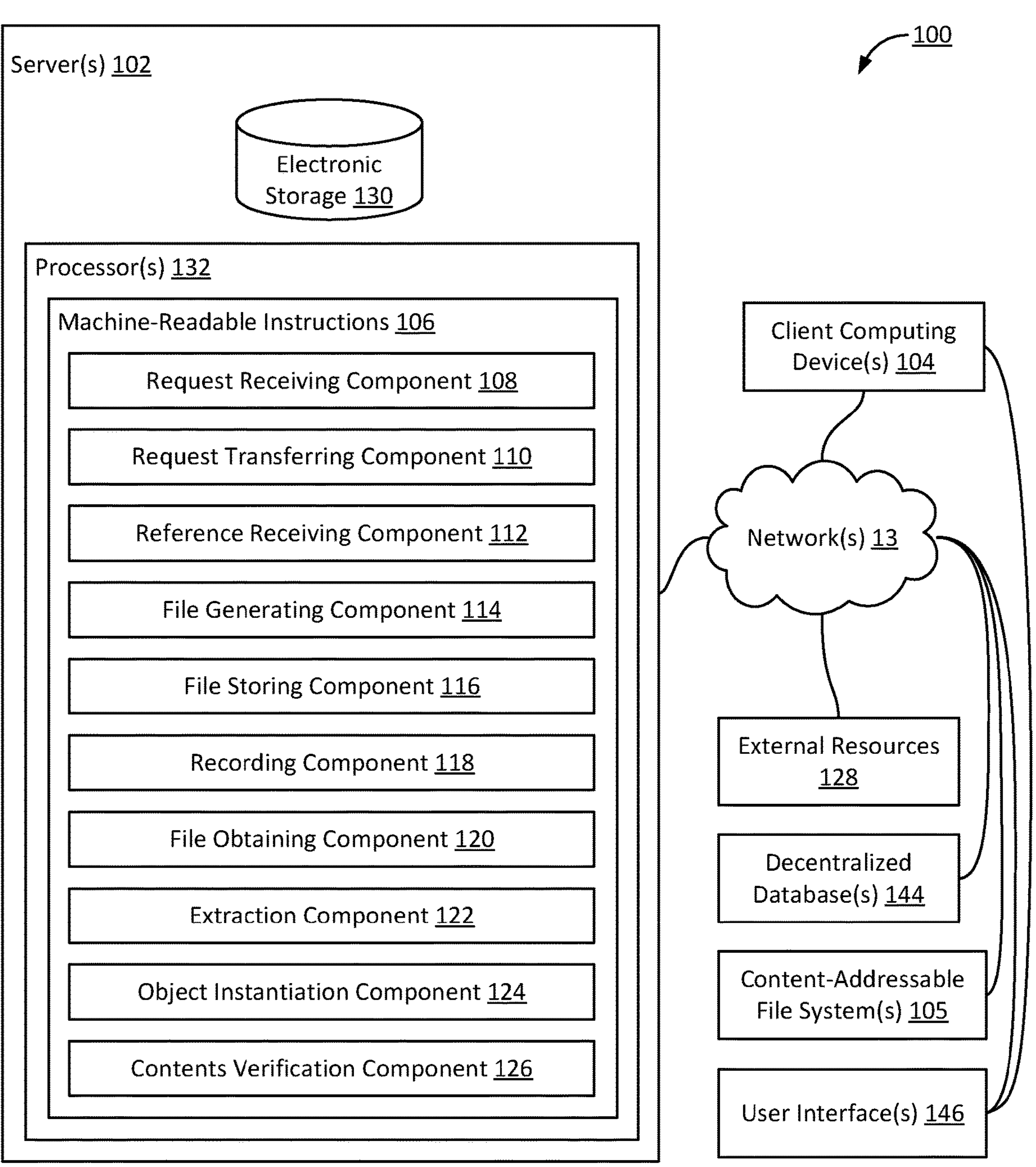
FIG. 1 illustrates a system configured for writing updates to and/or reading previously stored updates of assets that are implemented as smart contracts on a decentralized database, in accordance with one or more implementations.

FIG. 1 illustrates a system 100 configured for writing updates to and/or reading previously stored updates of assets that are implemented as smart contracts on a decentralized database 144, in accordance with one or more implementations. In some implementations, system 100 may include one or more servers 102, one or more client computing devices 104, one or more decentralized databases 144, one or more content-addressable file systems 105, one or more user interfaces 146, one or more external resources 128, and/or other components. Server(s) 102 may be configured to communicate with one or more client computing devices 104 according to a client/server architecture and/or other architectures.

Client computing device(s) 104 may be configured to communicate with other client computing devices via server(s) 102 and/or according to a peer-to-peer architecture and/or other architectures. Users may access system 100 via client computing device(s) 104. The users may include a first user, a second user, a third user, and so forth. Individual client computing devices 104 may be associated with individual users. For example, a first client computing device 104 may be associated with the first user, a second client computing device 104 may be associated with the second user, and so forth. Individual user interfaces 146 may be associated with individual users. For example, a first user interface 146 may be associated with the first user, a second user interface 146 may be associated with the second user, and so forth. Individual user interfaces 146 may be associated with individual client computing devices 104. For example, a first user interface 146 may be associated with the first client computing devices 104, a second user interface 146 may be associated with the second client computing devices 104, and so forth. In some implementations, user access to system 100 may be facilitated through individual user accounts that are associated with individual users.

In some implementations, decentralized database 144 be configured to facilitate sharing information among users in different physical locations, using different computing devices and/or platforms. Decentralized database 144 may be configured to facilitate sharing control and/or hosting responsibilities of shared information among multiple users, e.g., to prevent a single point of failure.

Ledgers may produce a secure record or registry of ownership of assets, transactions, and other information. In some implementations, decentralized database 144 may include a ledger. In some implementations, a ledger may be implemented as a database, such as decentralized database 144. For example, a blockchain is a type of ledger, as well as a type of decentralized database that stores a registry of assets and transactions. Blockchain technology may be used for cryptocurrencies, smart contracts, and/or other applications for a decentralized database. In some implementations, decentralized database 144 may include and/or implement a blockchain. In some implementations, decentralized database 144 may be configured to store a registry of assets, transactions, and/or other information. Individual assets and/or smart contracts stored on decentralized database 144 may be accessible through individual addresses.

In some implementations, decentralized database 144 may store a registry of assets and transactions across one or more networks 13, including but not limited to the internet and/or other networks. Assets may be owned by users. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights. Tokens are a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of decentralized database 144.

In some implementations, decentralized database 144 may record ownership of assets. Alternatively, and/or simultaneously, decentralized database 144 may record transactions that modify ownership of assets. A smart contract may be a type of asset. In some implementations, certain types of assets may be implemented as smart contracts on decentralized database 144. For example, a particular smart contract may implement a particular asset such that the particular asset's value is defined within the particular smart contract. For example, a particular smart contract may implement a particular asset such that the particular asset's ownership is defined within the particular smart contract.

In some implementations, operations and/or transactions involving these assets may be implemented as function calls to a smart contract. For example, a user may invoke a particular operation and/or transaction by transferring an amount of consideration to a particular address associated with a particular smart contract such that decentralized database 144 executes the particular operation and/or transaction. In some implementations, decentralized database 144 may be configured to interoperate with components external to decentralized database 144, including but not limited to content-addressable file system 105 and/or other components. For example, assets recorded on decentralized database 144 may be configured to invoke executable code (or effectuate the invocation of executable code) that is executed external to decentralized database 144. For example, a particular asset may use an external function call to execute code externally to decentralized database 144 that returns a value and/or object to the code of the particular asset. Through such a mechanism less code may need to be executed on decentralized database 144, which may increase efficiency and/or speed, decrease cost, and/or both.

In some implementations, once a smart contract has been added to decentralized database 144, the smart contract may be referred to as published, posted, and/or recorded. In some implementations, elements of decentralized database 144 may be grouped together in units that are referred to as blocks. Individual blocks may be linked or chained together to form a structure of blocks and/or a hierarchy of blocks, such as, e.g., a chain of blocks. An individual block may include one or more assets and one or more transactions. In some implementations, elements of decentralized database 144 may be linked together in a manner that prevents tampering, such as, e.g., a hash chain. Individual elements and/or transactions may be linked or chained together to form a structure and/or a hierarchy of elements and/or transactions.

In some implementations, decentralized database 144 may be publicly accessible and append-only. In some implementations, existing blocks of decentralized database 144 can substantially not be altered or deleted, unless multiple copies of the database are altered. This may be unlikely to happen provided that multiple copies and/or versions of the database are stored on different computing platforms, e.g., in different geographical locations. In some implementations, decentralized database 144 may be replicated on multiple computing platforms, preferably in multiple different geographical locations. As used herein, the term "distributed" refers to multiple computing platforms located in multiple separate and distinct geographical locations operating together to provide particular functionality, such as, e.g., in the case of a particular distributed database, the functionality of a blockchain.

Server(s) 102 may be configured by machine-readable instructions 106. Machine-readable instructions 106 may include one or more instruction components. The instruction components may include computer program components. The instruction components may include one or more of request receiving component 108, request transferring component 110, reference receiving component 112, file generating component 114, file storing component 116, recording component 118, file obtaining component 120, extraction component 122, object instantiation component 124, contents verification component 126, and/or other instruction components.

Request receiving component 108 may be configured to receive requests from client computing devices 104. The requests may include read requests, write requests, and/or other requests pertaining to particular assets of decentralized database 144. In some implementations, the requests may include a first request, a second request, a third request, and/or other requests. In some implementations, individual requests may involve reading, writing, modifying and/or deleting the state of an asset. Assets may have state, including but not limited to the values of constants, variables, data structures, and/or other information associated with the assets. The state of assets may include permanent information that cannot be modified by users and non-permanent information that can be modified by (at least some of the) users. For example, a first asset may have a first state, a second asset may have a second state, a third asset may have a third state, and so forth. In some implementations, the state for different types of assets may include different types of information. The state of assets may include and/or refer to a list of file identifiers, file addresses, device identifiers, device addresses, object identifiers, and/or other identifiers or addresses that list and/or identify computing devices and/or objects within system 100.

In some implementations, request receiving component 108 may be configured to receive a request to write information, e.g. an update, to a particular asset. In some implementations, request receiving component 108 may be configured to receive a request to read information, e.g., one or more previously stored updates, of a particular asset. For example, in some implementations, a request to write an update to a particular asset may be a request to write an update to all or some of the state of the particular asset (wherever it may be stored and/or recorded). For example, in some implementations, a request to read one or more previously stored updates of a particular asset may be a request to read all or some of the state of the particular asset (wherever it may be stored and/or recorded).

In some implementations, the state of an asset may include a reference to a file on a file system external to decentralized database 144, including but not limited to content-addressable file system 105. In some implementations, such a reference may be a hash value that is generated by hashing some or all of the state of the referenced file. In some implementations, the address of the referenced file on content-addressable file system 105 may include (or otherwise be based on) a hash value that is generated by hashing some of the contents of the referenced file or all of the contents of the referenced file. In some implementations, all or some of the information included in the referenced file may form part of the state of a particular asset. In some implementations, all or some of the information included in the referenced file may be executable code, such as code executable by decentralized database 144. The particular state of a particular asset may include one or more of information recorded on decentralized database 144, information stored in content-addressable file system 105, and/or other information. In some implementations, content-addressable file system 105 may be the Inter-Planetary File System (IPFS). For example, a particular file stored on content-addressable file system 105 may be accessed by an address that include a hash value that is generated by hashing all or some of the content of the particular file. This approach to generating addresses for files on content-addressable file system 105 may prevent and/or reduce duplication of information and/or files on the file system. This approach may prevent and/or reduce modifications and/or tampering with the contents of stored files, since any user reading a file can easily verify whether its contents matches its address. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function.

In some implementations, files stored on content-addressable file system 105 may be linked together to form a structure of files and/or a hierarchy of files, such as, e.g., a chain of files. For example, an original version of a particular file may have a first address, and a subsequent version of the particular file may include a reference (such as a link to the first address) to the original version of the particular file. The subsequent version may have a second address. Next, an even newer version of the particular file may include a reference (such as a link to the second address) to the preceding version of the particular file. Once a user (or a component of system 100) is provided with the address of a particular version of the particular file, the user (or the component of system 100) can recursively obtain previous versions of the particular file as well, by following the references/links until the original version is reached. In some implementations, the state of a particular asset recorded on decentralized database 144 may include multiple references to files on content-addressable file system 105. In some implementations, the state of a particular asset recorded on decentralized database 144 may only need to include a reference to the most recent file (or most recent version of a file and/or asset) in a list or chain of files on content-addressable file system 105, since previously stored files can be retrieved through stored links and/or references that are extracted from the contents of obtained files. Alternatively, and/or simultaneously, references to previously stored files can be retrieved through analyzing historical transactions of a particular asset on decentralized database 144, since individual updates may effectuate recording particular file references on decentralized database 144, in particular in a predetermined field or address of the particular asset.

In some implementations, request receiving component 108 may be configured to receive requests through one or more applications, such as an external authentication application, a client application, and/or another application. In some implementations, such applications may be configured to be executed on client computing devices 104. In some implementations, such applications may be configured to interact with (executable code that is executed on) decentralized database 144. In some implementations, such applications may be configured to interact with content-addressable file system 105. In some implementations, individual client computing platforms 104 may be associated with one or more cryptographic keys. For example, a particular computing device may be associated with a key pair of device-specific cryptographic keys that includes a public cryptographic key and a private cryptographic key to facilitate public-private key encryption and decryption (including but not limited to creating digital signatures). For example, individual device-specific private encryption keys may be stored securely on individual client computing devices 104. Alternatively, and/or simultaneously, individual user accounts may be associated with a different key pair of user-specific cryptographic keys that includes a public cryptographic key and a private cryptographic key to facilitate public-private key encryption and decryption (including but not limited to creating digital signatures). For example, individual user-specific private encryption keys may be stored securely on an external server or elsewhere. In some implementations, a particular device identifier and/or a particular device address may be based on and/or created by using one or more cryptographic keys of a particular key pair. In some implementations, a particular request received by request receiving component 108 through an external application may include a digital signature created by, e.g., a device-specific cryptographic key. For example, the origin of the particular request may be traced back to a particular client computing device. In some implementations, a particular request received by request receiving component 108 through an external application may include a digital signature created by a user-specific cryptographic key. Alternatively, and/or simultaneously, in some implementations, particular generated information generated by file generating component 114 may include a digital signature created by a user-specific cryptographic key. For example, the origin of a particular update request or generated update may be traced back to a particular user. In some implementations, a particular request received by request receiving component 108 through an external application may include one or more digital signatures created by using both a device-specific cryptographic key and a user-specific cryptographic key. A digital signature created by using both a device-specific cryptographic key and a user-specific cryptographic key may be referred to as a multi-signature.

Request transferring component 110 may be configured to transfer requests to decentralized database 144. In some implementations, request transferring component 110 may be configured to transfer a particular request from server 102 to decentralized database 144. In some implementations, request transferring component 110 may be configured to transfer a particular request from client computing device 104 to decentralized database 144. In some implementations, a particular request may identify a particular asset recorded on decentralized database 144. In some implementations, transferring a request to decentralized database 144 may be implemented as calling and/or otherwise invoking a function of a particular asset. In some implementations, transferring a request to decentralized database 144 may be implemented as calling and/or otherwise invoking a function on decentralized database 144 with an input or reference to a particular asset. In some implementations, a request to decentralized database 144 may include information, such as a particular update for a particular asset. For example, the particular update may modify the current value of a particular parameter of the particular asset. For example, the particular update may modify certain state of the particular asset. For example, all or some of the particular update may be recorded on decentralized database 144, stored on content-addressable file system 105, and/or stored elsewhere.

Reference receiving component 112 may be configured to receive information from other components of system 100, including but not limited to information from decentralized database 144. The received information may include, but is not limited to, references, and/or other information. In some implementations, reference receiving component 112 may be configured to receive references responsive to transfers of requests such as, e.g., by request transferring component 110. In some implementations, a received reference may refer to a file. For example, a particular reference may refer to a particular file on content-addressable file system 105. In some implementations, a received reference may include and/or be part of an address of a particular file. In some implementations, a received reference may include and/or be part of a location of a particular file. In some implementations, received information may refer to one or more files, e.g., files stored on content-addressable file system 105.

File generating component 114 may be configured to generate files, references to files, and/or other information. Generated information may include information received from request receiving component 108 and/or any other component of system 100. For example, particular generated information may include an update included in a particular write request. In some implementations, particular generated information may include information included in the state of a particular asset. In some implementations, the contents of a generated file may include and/or be based on the update included in a write request, a reference to a file (e.g., a reference received from reference receiving component 112, such as, by way of non-limiting example, an address of a file stored in content-addressable file system 105, a hash value generated by hashing certain information, a time stamp, etc.), and/or other information. In some implementations, the contents of a generated file may include the state of an asset, the contents of another file (e.g., a file stored in content-addressable file system 105), a hash value generated by hashing certain information, a time stamp, one or more digital signatures, and/or other information. In some implementations, the contents of a generated file may include an identifier that identifies the particular client computing device 104 that originated a particular write request. In some implementations, the contents of a generated file may include a digital signature based on a device-specific cryptographic key, a public address associated with a particular user (e.g., the public address of an electronic wallet associated with the particular user), a name and/or identifier of the particular user, one or more time stamps (e.g., the time stamp of the moment a particular user account was created), an identifier of the algorithm and/or hashing function used to create the digital signature, and/or other information.

In some implementations, file generating component 114 may be configured to validate and/or verify whether particular generated information is authentic, permitted, and/or consistent with other information, such as previously stored updates.

File storing component 116 may be configured to store files on file systems, including but not limited to content-addressable file system 105. The particular location and/or address for storage may be based on a generated and/or received reference. In some implementations, the particular location and/or address for storing a particular file may be based on the contents of the particular file. For example, the contents of a particular file may be used as an input to a hash function and/or the output of a hash function may be used as the address of the particular file on content-addressable file system 105. In some implementations, file storing component 116 may be configured to validate and/or verify whether particular stored files or stored information is authentic, permitted, and/or consistent with other information, such as previously stored updates.

Recording component 118 may be configured to record information on decentralized database 144. Recorded information may include refences (e.g., to files), state of an asset, files, and/or other information. For example, particular recorded information may include particular state of a particular asset. For example, particular recorded information may include a particular reference included in the state of a particular asset. For example, particular recorded information may include an asset and/or a smart contract. For example, particular recorded information may represent a transaction on decentralized database 144. In some implementations, recording information on decentralized database 144 may include verifying and/or validating whether the user and/or client computing device requesting to record the information has permission to do so. In some implementations, recording component 118 may be configured to provide one or more digital signatures when recording information on decentralized database 144. In some implementations, one or more of the digital signatures may be used to verify and/or validate whether a particular update is authentic and/or permitted. In some implementations, one or more of the digital signatures may be used in the future to trace particular updates back to particular client computing devices 104 and/or particular users. In some implementations, recording component 118 may be configured to validate and/or verify whether particular recorded information is authentic, permitted, and/or consistent with other information, such as previously stored updates. For example, the contents of recorded information (or information referenced thereby) may be validated and/or verified by code that is executed on decentralized database 144 (e.g., by on-chain functions that can access content-addressable file system 105). Alternatively, and/or simultaneously, all or some of such validation and/or verification may be performed external to decentralized database 144, e.g., on client computing device 104. In some implementations, part of such validation and/or verification may be performed after particular updates have been written to assets on decentralized database 144, or after previously stored updated have been read. For example, one or more digital signatures (or multi-signatures) related to a particular request may have been recorded on decentralized database 144 for future reference (e.g., validation and/or verification). For example, system 100 may verify whether a particular client computing device had permission to update a particular asset on decentralized database 144. Alternatively, and/or simultaneously, system 100 may verify whether a particular user was properly authenticated and/or permitted to update the particular asset on decentralized database 144.

File obtaining component 120 may be configured to obtain files from file systems, including but not limited to content-addressable file system 105. In some implementations, obtainment of a particular file may be based on a particular reference, including but not limited to received references, generated references, and/or other references. File obtaining component 120 may be configured to perform active obtainment (such as, e.g., downloading a file), passive obtainment (such as, e.g., a file being pushed to file obtaining component 120), and/or other types of obtainment.

Extraction component 122 may be configured to extract information from files. For example, extraction component 122 may perform analysis on the contents of one or more files to determine and/or otherwise extract information. For example, extraction component 122 may be configured to extract, from a particular file or a particular asset, a reference to another file, e.g., on content-addressable file system 105. In some implementations, extraction component 122 may be configured to extract and/or determine whether a particular file includes a file reference to another file. For example, a particular type of asset may include a particular address and/or field that may refer to linked information (e.g., a linked asset, a linked file, and/or other linked information), or that may refer to nothing/null (i.e., not another file or asset). Extraction component 112 may perform analysis on a particular asset to determine whether its particular included address and/or field refers to any linked information. In some implementations, system 100 may be configured to repeatedly and/or recursively extract and/or determine information, starting with a particular file, that indicates whether the contents of the particular file refers to another file or another version of the particular file, and if so, obtain the referenced file to continue until no more files are referenced.

Contents verification component 126 may be configured to perform one or more types of verifications on assets, files, and/or references to files. One type of verification may verify whether an asset is owned by a particular user. One type of verification may verify whether a file includes particular content, such as a particular link. One type of verification may verify whether the contents of a particular file produces a particular hash value when hashed. One type of verification may verify whether a particular reference refers to a particular file, or any file. One type of verification may verify whether a particular reference corresponds to the contents of a particular file. For example, verifications may include comparisons of different values, comparisons with threshold levels, extractions and/or analysis by extraction component 122, and/or other determinations. In some implementations, one type of verification may verify whether the particular reference and/or hash value included in a read or write request corresponds to a reference or a hash value in a particular asset. In some implementations, one type of verification may verify whether the particular reference and/or hash value included in a referenced file corresponds to a reference or a hash value stored on decentralized database 144.

Object instantiation component 124 may be configured to store, on decentralized database 144, code executable by decentralized database 144. By way of non-limiting example, one or more sets of code may be executable by a blockchain. In some implementations, one or more sets of code may be configured to instantiate and/or deploy objects, assets, smart contracts, and/or other entities that include executable code. For example, a particular set of code may be configured to instantiate and/or deploy objects and/or assets in one or more of decentralized database 144, a blockchain included in and/or implemented by decentralized database 144, a distributed computing platform maintained by a blockchain, a runtime environment for smart contracts and other applications on a blockchain, and/or a code space. In some implementations, individual instantiated objects may be identified by individual object identifiers. In some implementations, instantiated objects and/or assets may include multiple classes of different types of objects and/or assets. In some implementations, a particular type of instantiated object and/or asset may be an organization object, as described in incorporated U.S. Pat. No. 10,412,086. In some implementations, a particular type of object and/or asset may be an organization-controlled asset object, as described in incorporated U.S. Pat. No. 10,412,086. By way of non-limiting example, instantiated objects may include a first object, a second object, a third object, etc., a first organization object, a second organization object, a third organization object, etc., a first organization-controlled asset object, a second organization-controlled asset object, a third organization-controlled asset object, etc.

In some implementations, instantiated objects and/or assets may have state, including but not limited to the values of constants, variables, data structures, and/or other information associated with the objects and/or assets. In some implementations, the state for different types of objects and/or assets may include different types of information. For example, the state of objects and/or assets may include and/or refer to a list of device identifiers, device addresses, object identifiers, asset identifiers, and/or other identifiers that list and/or identify computing devices that are permitted to take certain actions, including but not limited to modifying states of objects and/or assets. For example, the first organization-object state of a first organization object may include a list of device addresses that identify computing devices that are permitted to make certain modifications to the first organization-object state (such as, e.g., write an update to the state of an asset). For example, the second organization-object state of a second organization object may include a list of device addresses that identify computing devices that are permitted to make certain modifications to the second organization-object state, and so forth. For example, the first organization-controlled asset object state of a first organization-controlled asset object may include a reference to a list of device addresses that identify computing devices that are permitted to make certain modifications to the first organization-controlled asset object state (such as, e.g., write an update to the state of an asset). For example, the second organization-controlled asset object state of a second organization-controlled asset object may include a reference (e.g., a link) to a list of device addresses that identify computing devices that are permitted to make certain modifications to the second organization-controlled asset object state, and so forth. In some preferred embodiments, such a reference may be an object identifier, such as an organization object identifier that identifies an organization object. For example, the reference included in the second organization-controlled asset object state may refer to the first organization object identifier, such that a change in the list of permitted devices for the first organization object may imply the same change in the set of computing devices that are permitted to make certain modifications to the first organization-controlled asset object state.

Figure 4:
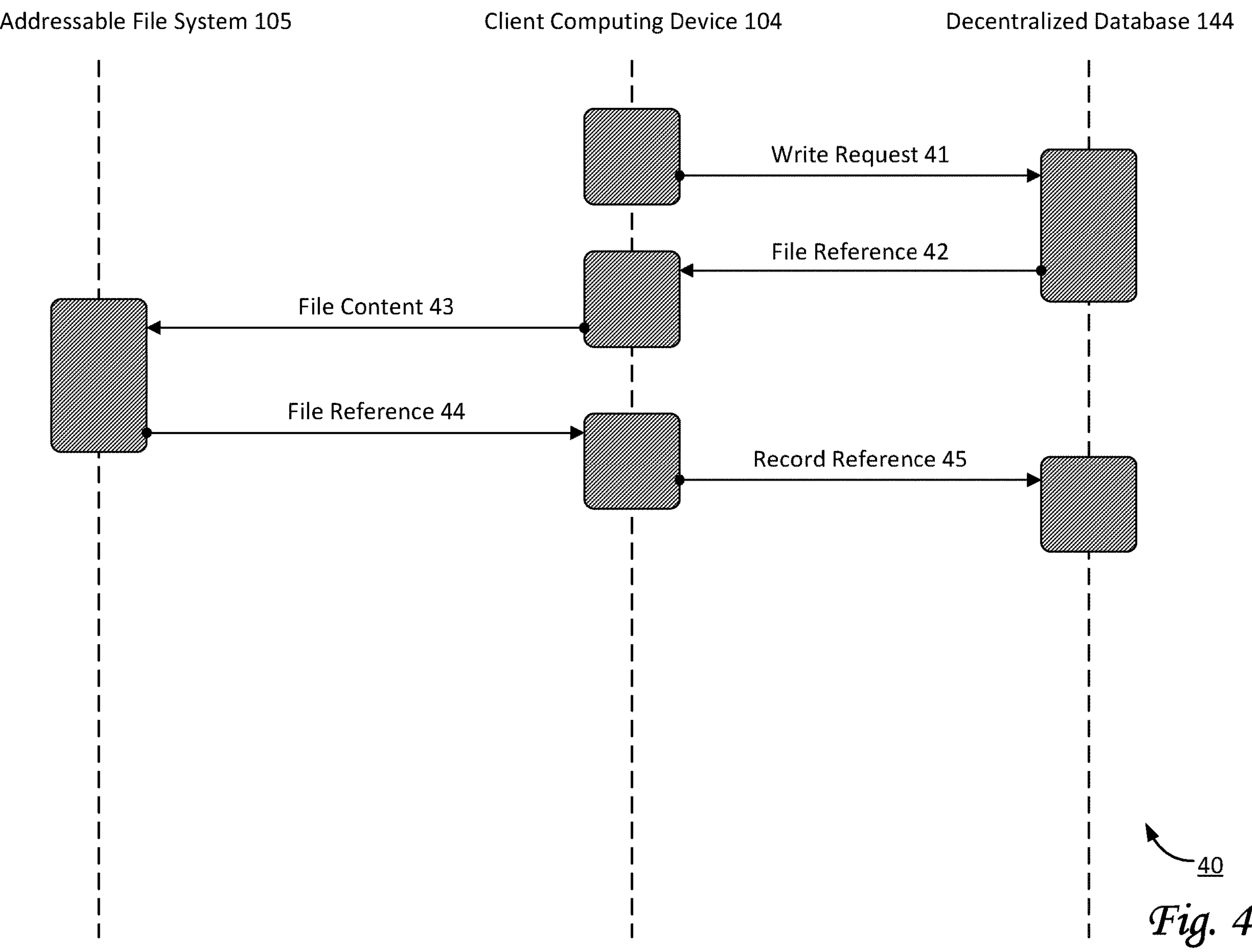
FIGS. 4-5 illustrate exemplary transactional diagrams of actions and transactions performed in a system that facilitates writing updates to and/or reading previously stored updates of assets that are implemented as smart contracts on a decentralized database, in accordance with one or more implementations.

By way of non-limiting example, FIG. 4 illustrates an exemplary transactional diagram 40 of actions and transactions performed in system 100. The depicted transaction in transactional diagram 40 represents writing an update to a particular asset that is recorded on decentralized database 144, and is initiated by a write request 41 from client computing device 104 to decentralized database 144. Subsequent to write request 41, client computing device 104 receives a file reference 42 from decentralized database 144. File reference 42 refers to a file on content-addressable file system 105. Subsequent to receipt of file reference 42, file content 43 is generated and stored on content-addressable file system 105, at a particular address that is indicated by a file reference 44. In some implementations, content-addressable file system 105 may provide file reference 44 to client computing device 104. Alternatively, in some implementations, client computing device 104 may have generated file reference 44 locally. Subsequent to generating and/or receiving file reference 44, client computing device 104 may perform an action indicated by record reference 45 in FIG. 4, which effectuates recording a particular file reference on decentralized database 144, in particular in a field or address of the particular asset.

Figure 5:
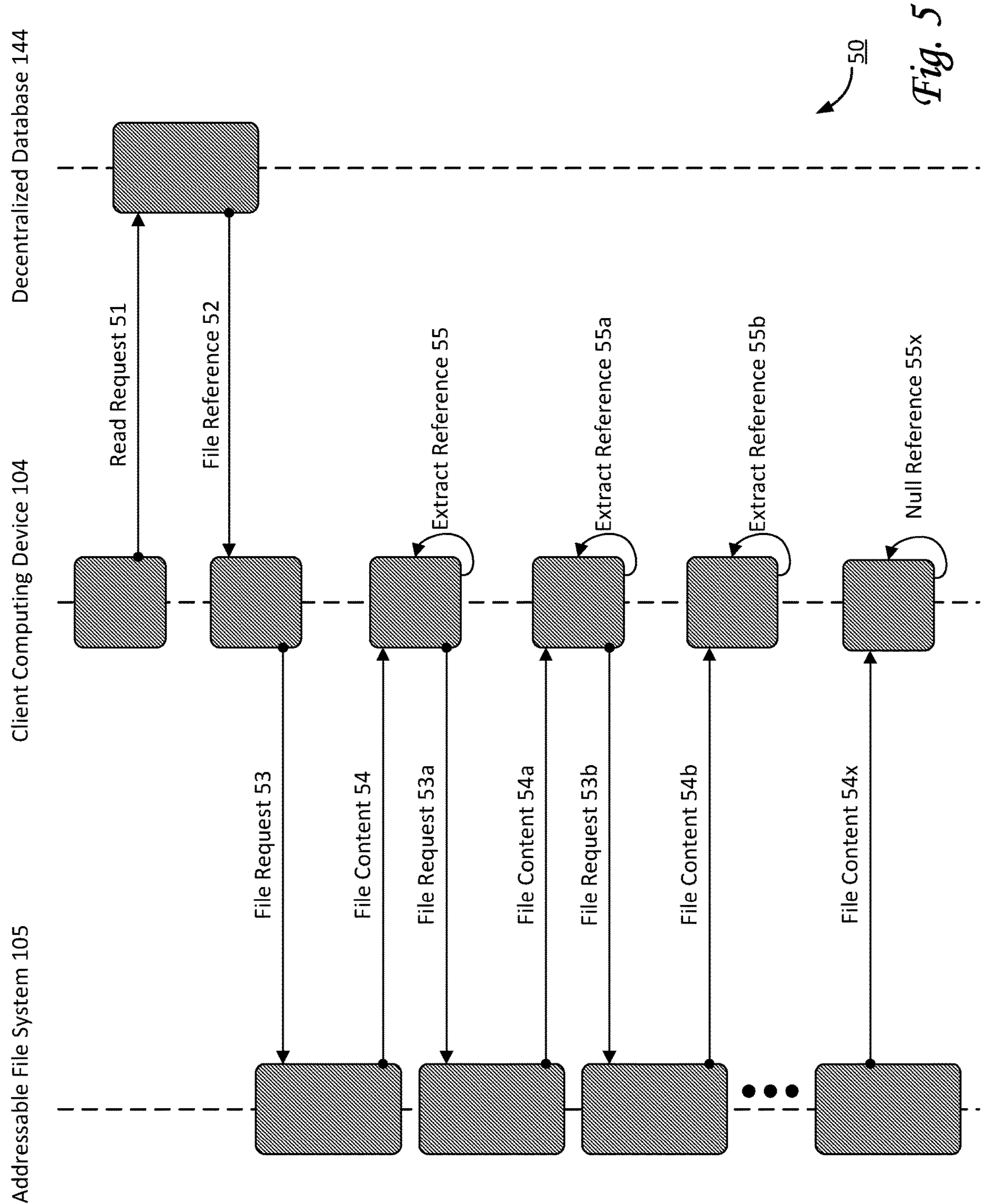

By way of non-limiting example, FIG. 5 illustrates an exemplary transactional diagram 50 of actions and transactions performed in system 100. The depicted transaction in transactional diagram 50 represents reading one or more previously stored updates of a particular asset that is recorded on decentralized database 144, and is initiated by a read request 51 from client computing device 104 to decentralized database 144. Subsequent to read request 51, client computing device 104 receives a file reference 52 from decentralized database 144. File reference 52 refers to a file on content-addressable file system 105 (e.g., the latest version of the particular asset). Subsequent to receipt of file reference 52, client computing device 104 accesses content-addressable file system 105 through a file request 53. Subsequently, content-addressable file system 105 responds with file content 54, which is analyzed by client computing device 104 to perform an action indicated by extract reference 55 in FIG. 5. As depicted, the extracted reference refers to another version of the particular asset on content-addressable file system 105, which is retrieved by a file request 53*a*. Subsequently, content-addressable file system 105 responds with file content 54*a*, which is in turn analyzed by client computing device 104 to extract reference 55*a* in FIG. 5. As depicted, the extracted reference 55*a* refers to another version of the particular asset on content-addressable file system 105, which is retrieved by a file request 53*b*. Subsequently, content-addressable file system 105 responds with file content 54*b*, which is in turn analyzed by client computing device 104 to extract reference 55*b* in FIG. 5. As depicted, the files referenced by file request 53, file request 53, file request 53*b*, and/or other files may form a linked chain of order versions of the same particular asset. For example, the link may end at an original version (having file content 54*x*, from which no additional reference can be extracted, since it refers to a null reference 55*x*, as depicted in FIG. 5. Reading the history of a particular asset may include reading a linked chain of ordered versions of the particular asset, e.g., starting at the most recent version and working back to the original version.

User interfaces 146 may be configured to facilitate interaction between users and system 100 and/or between users and client computing platforms 104. For example, user interfaces 146 may provide an interface through which users may provide information to and/or receive information from system 100. In some implementations, individual user interfaces 146 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, a user may enter write requests (or information that forms the basis for a write request) as described herein, as may be received by request receiving component 108. In some implementations, a user may enter read requests (or information that forms the basis for a write request) as described herein, as may be received by request receiving component 108. In some implementations, a user may be provided with information resulting from a particular read request, such as the contents of one or more previously stored updates of a particular asset. In some implementations, one or more user interfaces 146 may be included in one or more client computing platforms 104. In some implementations, one or more user interfaces 146 may be included in system 100.

In some implementations, an individual asset may be accessible through an individual address on decentralized database 144. In some implementations, the individual asset may be associated with a physical object. The physical object may include scannable information, such as a QR code, which may refer to the individual address of the individual asset on decentralized database 144. Based on the individual address, the history of the individual asset may be retrieved and provided to a user, e.g., on user interface 146. In some implementations, individual updates in this history may be verified and/or validated by comparing their respective addresses on content-addressable file system 105 with the contents of the corresponding individual updates. Accordingly, the user may trust the provided information.

In some implementations, server(s) 102, client computing device(s) 104, and/or external resources 128 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing device(s) 104, and/or external resources 128 may be operatively linked via some other communication media.

A given client computing device 104 may include one or more processors configured to execute computer program components. The computer program components may be configured to enable an expert or user associated with the given client computing device 104 to interface with system 100 and/or external resources 128, and/or provide other functionality attributed herein to client computing device(s) 104. By way of non-limiting example, the given client computing device 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, external resources 128 may include one or more applications. Individual ones of the one or more applications may include applications external to decentralized database 144, content-addressable file system 105, and/or other components of system 100. The applications may include one or more of a user authentication application, a device authentication application, a client application, and/or other applications. The applications may be configured to be executed on client computing devices 104. In some implementations, the applications may be configured to interact with (executable code that is executed on) decentralized database 144. In some implementations, the applications may be configured to interact with content-addressable file system 105.

In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing device(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor (s) 132 may be configured to execute components 108, 110, 112, 114, 116, 118, 120, 122, 124, and/or 126, and/or other components. Processor(s) 132 may be configured to execute components 108, 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within a single processing unit, in implementations in which processor(s) 132 includes multiple processing units, one or more of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described below is for illustrative purposes, and is not intended to be limiting, as any of components 108, 110, 112, 114, 116, 118, 120, 122, 124, and/or 126 may provide more or less functionality than is described. For example, one or more of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As another example, processor(s) 132 may be configured to execute one or more additional components that may perform some or all of the functionality attributed below to one of components 108, 110, 112, 114, 116, 118, 120, 122, 124, and/or 126.

Figure 2:
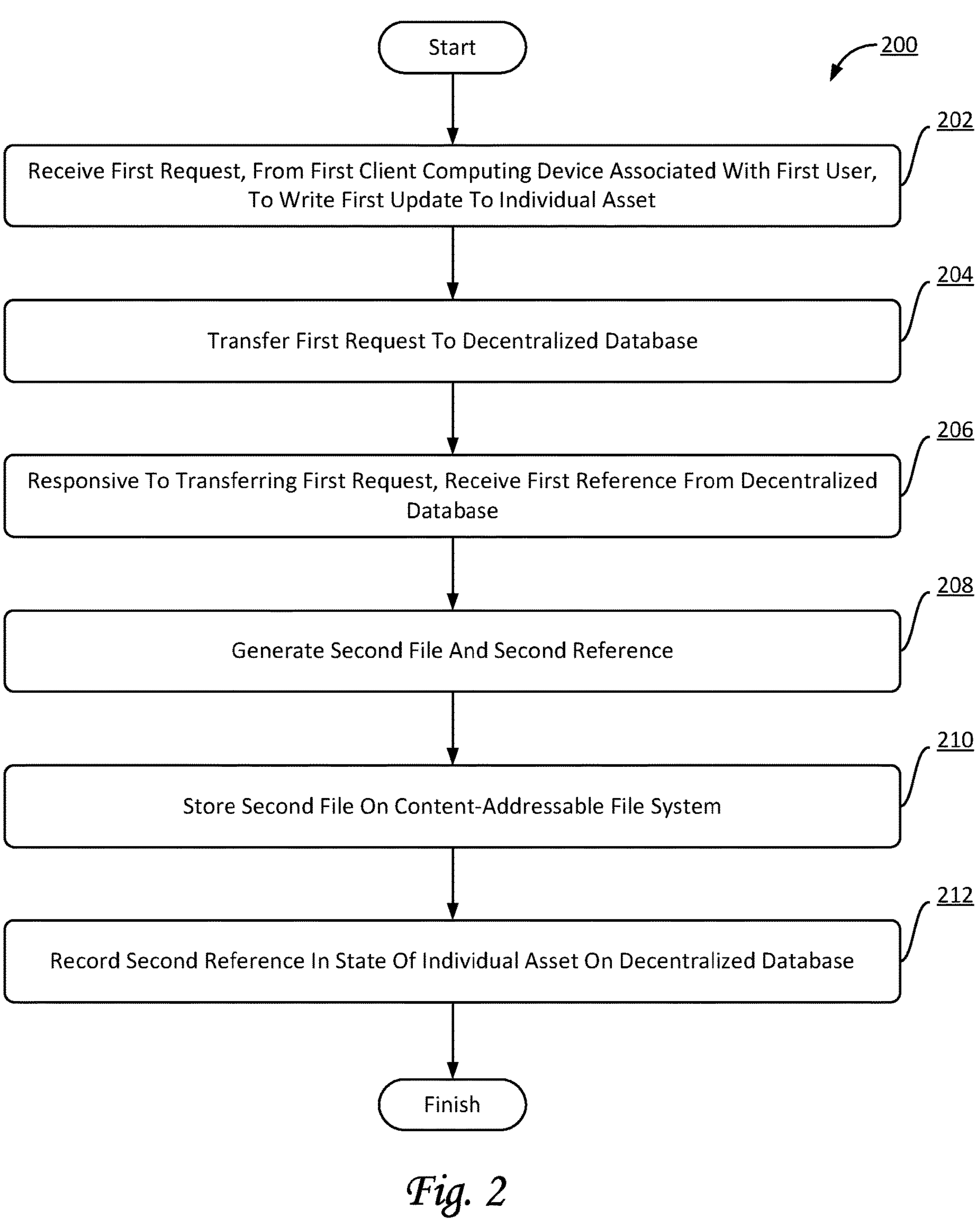
FIGS. 2-3 illustrate methods for writing updates to and/or reading previously stored updates of assets that are implemented as smart contracts on a decentralized database, in accordance with one or more implementations.
Figure 3:
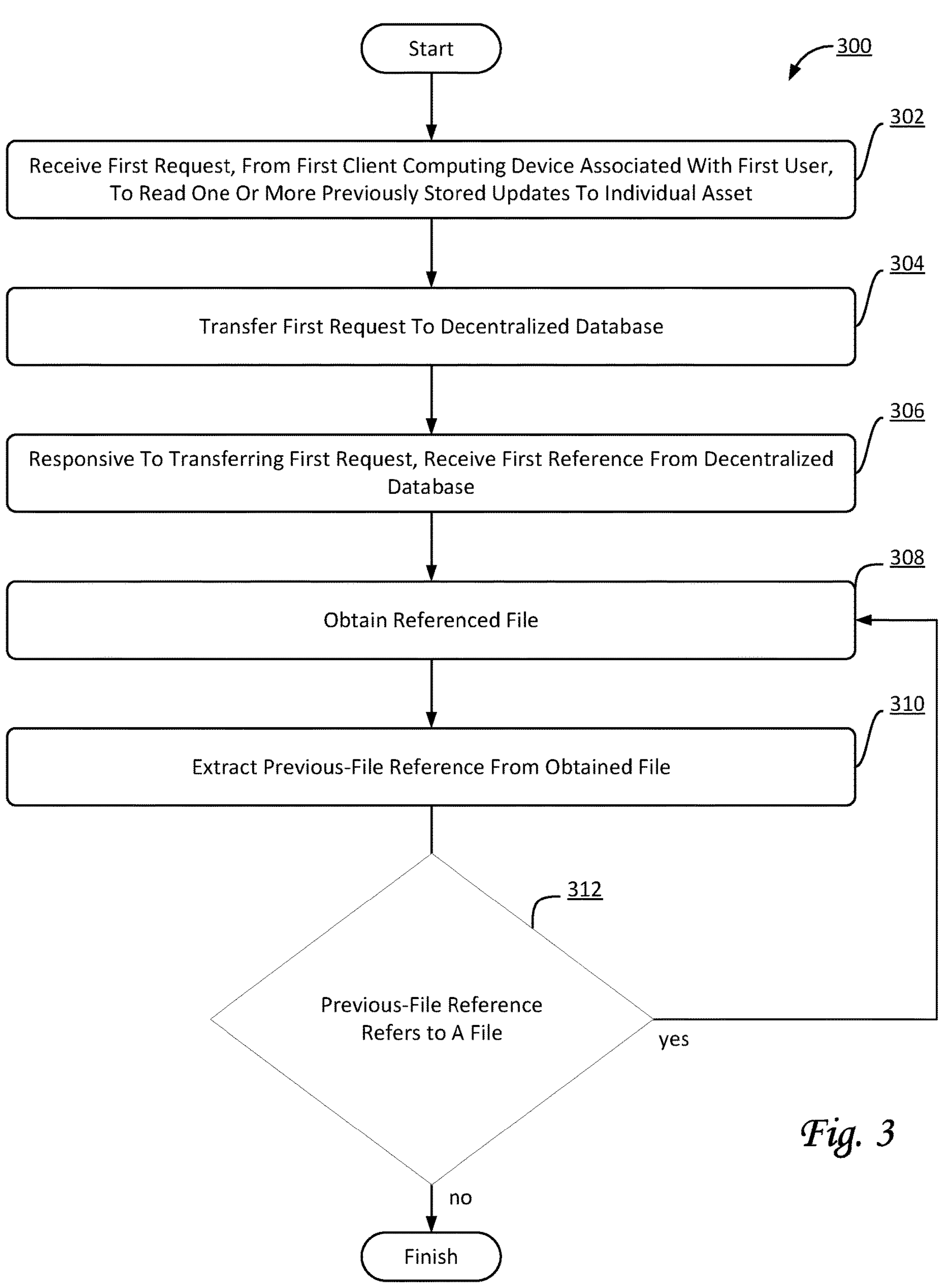

FIGS. 2-3 illustrate methods 200 and 300 for writing updates to and reading previously stored updates of assets that are implemented as smart contracts on a decentralized database, in accordance with one or more implementations. The operations of methods 200-300 presented below are intended to be illustrative. In some implementations, methods 200-300 may be accomplished with one or more additional operations not described, and/or without one or more of the operations discussed. Additionally, the order in which the operations of methods 200-300 are illustrated in FIGS. 2-3 and described below is not intended to be limiting.

In some implementations, methods 200-300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 200-300 in response to instructions stored electronically on an electronic storage medium. The one or more processing devices may include one or more devices configured through hardware, firmware, and/or software to be specifically designed for execution of one or more of the operations of methods 200-300.

Regarding method 200, an operation 202 may include receiving a first request, from a first client computing device associated with a first user, to write a first update to an individual asset. The individual asset may have a state. The state may include a first reference to a first file on a content-addressable file system. Information included in the first file forms part of the state of the individual asset. Operation 202 may be performed by one or more hardware processors configured by machine-readable instructions including a component that is the same as or similar to request receiving component 108, in accordance with one or more implementations.

An operation 204 may include transferring the first request to the decentralized database. Operation 204 may be performed by one or more hardware processors configured by machine-readable instructions including a component that is the same as or similar to request transferring component 110, in accordance with one or more implementations.

An operation 206 may include receiving the first reference from the decentralized database, responsive to transferring the first request. The first reference may refer to the first file on the content-addressable file system. Operation 206 may be performed by one or more hardware processors configured by machine-readable instructions including a component that is the same as or similar to reference receiving component 112, in accordance with one or more implementations.

An operation 208 may include generating a second file and a second reference. Contents of the second file may include the first update and the first reference to the first file. The second reference may refer to the second file on the content-addressable file system. Operation 208 may be performed by one or more hardware processors configured by machine-readable instructions including a component that is the same as or similar to file generating component 114, in accordance with one or more implementations.

An operation 210 may include storing the second file on the content-addressable file system. Storage may be based on the second reference. Operation 210 may be performed by one or more hardware processors configured by machine-readable instructions including a component that is the same as or similar to file storing component 116, in accordance with one or more implementations.

An operation 212 may include recording the second reference in the state of the individual asset on the decentralized database. Operation 212 may be performed by one or more hardware processors configured by machine-readable instructions including a component that is the same as or similar to recording component 118, in accordance with one or more implementations.

Regarding method 300, an operation 302 may include receiving a first request, from a first client computing device associated with a first user, to read one or more previously stored updates of an individual asset that is implemented as a smart contract on a decentralized database. The individual asset may have a state. The state may include a first reference to a first file on a content-addressable file system. Information included in the first file forms part of the state of the individual asset. Operation 302 may be performed by one or more hardware processors configured by machine-readable instructions including a component that is the same as or similar to request receiving component 108, in accordance with one or more implementations.

An operation 304 may include transferring the first request to the decentralized database. Operation 304 may be performed by one or more hardware processors configured by machine-readable instructions including a component that is the same as or similar to request transferring component 110, in accordance with one or more implementations.

An operation 306 may include receiving the first reference from the decentralized database, responsive to transferring the first request. The first reference may refer to the first file on the content-addressable file system. Operation 306 may be performed by one or more hardware processors configured by machine-readable instructions including a component that is the same as or similar to reference receiving component 112, in accordance with one or more implementations.

An operation 308 may include obtaining the referenced file, from the content-addressable file system. Operation 308 may be performed by one or more hardware processors configured by machine-readable instructions including a component that is the same as or similar to file obtaining component 120, in accordance with one or more implementations.

An operation 310 may include extracting a previous-file reference from the obtained file. Operation 310 may be performed by one or more hardware processors configured by machine-readable instructions including a component that is the same as or similar to extraction component 122, in accordance with one or more implementations.

An operation 312 may include determining whether the extracted previous-file reference refers to a file on the content-addressable file system. Operation 312 may be performed by one or more hardware processors configured by machine-readable instructions including one or more components that are the same as or similar to extraction component 122 and/or contents verification component 126, in accordance with one or more implementations. Responsive to a determination that the extracted previous-file reference refers to another file, method 300 may continue with operation 308. Responsive to a determination that the extracted previous-file reference does not refer to another file, method 300 may end.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to modify assets that are stored (i) in part on a decentralized database that implements a blockchain, and (ii) in part on a file system that is distinct and separate from the blockchain, wherein the assets include a particular asset that has a state, wherein the state includes a first part of the state and a second part of the state, wherein the first part of the state of the particular asset has been stored on a content-addressable file system at a file address, and wherein the second part of the state of the particular asset has been stored on the blockchain with the file address, the system comprising:

one or more hardware processors configured by machine-readable instructions to:

receive a request to make a modification to the first part of the state of the particular asset;

generate a file that reflects the modification to the first part of the state, wherein the file includes the file address;

store the file to the content-addressable file system at an updated file address on the content-addressable file system, wherein inclusion of the file address in the file causes the file address to be reflected in the updated file address of the content- addressable file system at which the file is stored;

record, on the blockchain, the updated file address with the second part of the state of the particular asset; and subsequent to recording the updated file address on the blockchain, verify the updated file address correctly reflects the file address, and wherein the asset is implemented as a smart contract on the decentralized database.

2. The system of claim 1, wherein the request has been received from a first client computing device that is associated with a user.

3. The system of claim 1, wherein the one or more hardware processors are further configured by the machine-readable instructions to:

responsive to receiving the request, access the blockchain to obtain the file address.

4. The system of claim 3, wherein the inclusion of the file address in the updated file is based on the accessing of the blockchain to obtain the file address.

5. The system of claim 1, wherein the request is received from a computing device, and wherein the one or more hardware processors are further configured by the machine-readable instructions to verify the computing device is permissioned to make the request.

6. The system of claim 1, wherein recording the updated file address on the blockchain by the smart contract effectuates a subsequent change in the second part of the state of the particular asset.

7. The system of claim 1, wherein the one or more hardware processors are further configured by the machine-readable instructions to compare the modification to predefined criteria stored in the smart contract.

8. The system of claim 7, wherein the recording of the updated file address on the blockchain is performed responsive to the predefined criteria being met by the modification.

9. The system of claim 1, wherein the content-addressable file system is an Inter-Planetary File System, and wherein the updated file address is a hash value produced by a hashing function based on the contents of the updated file including the file address.

10. A method of modifying assets that are stored (i) in part on a decentralized database that implements a blockchain, and (ii) in part on a file system that is distinct and separate from the blockchain, wherein the assets include a particular asset that has a state, wherein the state includes a first part of the state and a second part of the state, wherein the first part of the state of the particular asset has been stored on a content-addressable file system at a file address, and wherein the second part of the state of the particular asset has been stored on the blockchain with the file address, the method comprising:

receiving a request to make a modification to the first part of the state of the particular asset;

generating a file that reflects the modification to the first part of the state, wherein the file includes the file address;

storing the file to the content-addressable file system at an updated file address on the content-addressable file system, wherein inclusion of the file address in the file causes the file address to be reflected in the updated file address of the content-addressable file system at which the file is stored; and recording the updated file address with the second part of the state of the particular asset on the blockchain; and subsequent to recording the updated file address on the blockchain, verifying the updated file address correctly reflects the file address; and wherein the asset is implemented as a smart contract on the decentralized database.

11. The method of claim 10, wherein the request is received from a first client computing device that is associated with a user.

12. The method of claim 10, further comprising, responsive to receiving the request, accessing the blockchain to obtain the file address.

13. The method of claim 12, wherein the inclusion of the file address in the updated file is based on accessing of the blockchain to obtain the file address.

14. The method of claim 10, wherein the request is received from a computing device, and wherein the method further comprises verifying the computing device is permissioned to make the request.

15. The method of claim 10, wherein recording the updated file address on the blockchain by the smart contract effectuates a subsequent change in the second part of the state of the particular asset.

16. The method of claim 10, further comprising comparing the modification to predefined criteria stored in the smart contract.

17. The method of claim 16, wherein the recording of the updated file address on the blockchain is performed responsive to the predefined criteria being met by the modification.

18. The method of claim 10, wherein the content-addressable file system is an Inter-Planetary File System, and wherein the updated file address is a hash value produced by a hashing function based on the contents of the updated file including the file address.

* * * * *